(12) United States Patent
Pereira et al.

(10) Patent No.: US 10,924,503 B1
(45) Date of Patent: Feb. 16, 2021

(54) IDENTIFYING FALSE POSITIVES IN MALICIOUS DOMAIN DATA USING NETWORK TRAFFIC DATA LOGS

(71) Applicant: Amazon Technologies, Inc., Seattle, WA (US)

(72) Inventors: Shane Anil Pereira, Bellevue, WA (US); Muhammad Wasiq, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 15/993,216

(22) Filed: May 30, 2018

(51) Int. Cl.
H04L 29/06 (2006.01)

(52) U.S. Cl.
CPC ...... H04L 63/1425 (2013.01); H04L 63/0236 (2013.01)

(58) Field of Classification Search
CPC ............. H04L 63/1416; H04L 63/1408; H04L 63/1441; H04L 63/1458
USPC ........................................................ 726/23
See application file for complete search history.

(56) References Cited

U.S. PATENT DOCUMENTS

| | | | |
|---|---|---|---|
| 8,762,298 B1* | 6/2014 | Ranjan | H04L 63/14 706/12 |
| 2011/0283357 A1* | 11/2011 | Pandrangi | H04L 63/1416 726/22 |
| 2015/0215334 A1* | 7/2015 | Bingham | H04L 63/1425 726/23 |

* cited by examiner

Primary Examiner — Evans Desrosiers
(74) Attorney, Agent, or Firm — Eversheds Sutherland (US) LLP

(57) ABSTRACT

Systems, methods, and computer-readable media are disclosed for systems and methods for identifying false positives in malicious domain data using network traffic data logs. Example methods may include determining a first domain name identifier in a set of domain name identifiers classified as malicious, determining a first IP address associated with the first domain name identifier, and determining first virtual private cloud (VPC) flow log data that corresponds to historical network traffic associated with the first IP address. Certain methods may include determining second VPC flow log data that corresponds to historical network traffic associated with a second IP address that is classified as non-malicious, determining, using the first VPC flow log data and the second VPC flow log data, that the first VPC flow log data is non-malicious, and determining that the first domain name identifier is to be classified as non-malicious.

17 Claims, 8 Drawing Sheets

IDENTIFYING FALSE POSITIVES IN MALICIOUS DOMAIN DATA USING NETWORK TRAFFIC DATA LOGS

BACKGROUND

Cyber threat intelligence data may include indicators of compromise, such as internet protocol (IP) addresses, uniform resource locators (URLs), malicious domain names, and the like. Certain entities, such as cybersecurity service providers, may publish or provide cyber threat intelligence data for use in cybersecurity protection by others. For example, users may use cyber threat intelligence data collected from a number of sources to enhance their own cybersecurity. However, certain cyber threat intelligence data may have relatively short lifespans of, for example, hours or days. For example, malicious IP addresses or domain names may be obsolete after 24 hours. Accordingly, cyber threat intelligence data may not be timely or may not be of high reliability. As a result, cyber threat intelligence data may include false positives, or may inaccurately identify certain computers or domain names as malicious.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
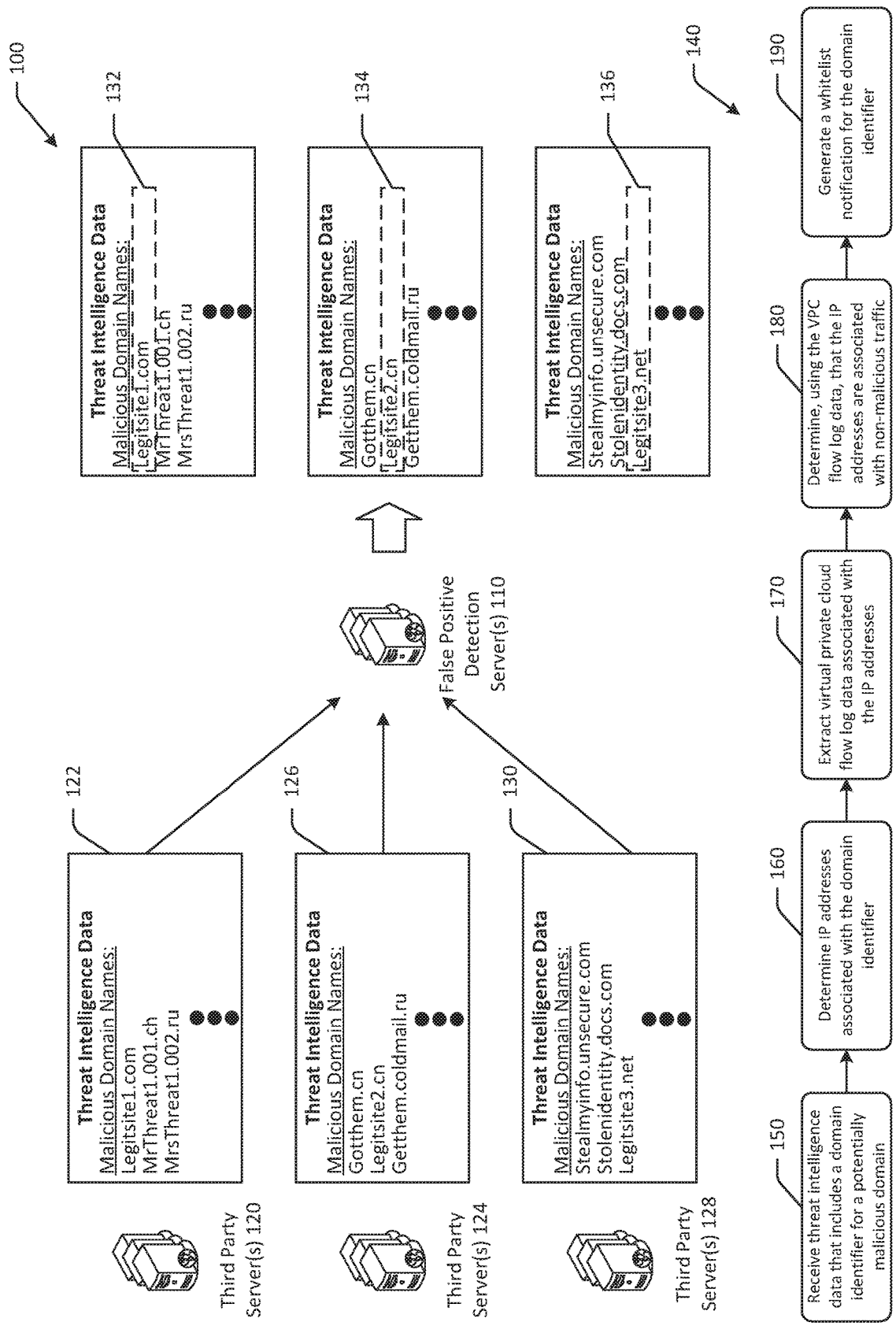
FIG. 1 is a schematic illustration of an example use case for identifying false positives in malicious domain data using network traffic data logs in accordance with one or more example embodiments of the disclosure.

Cybersecurity systems, such as intrusion detection systems, may be used to detect threats and to prevent unauthorized access to computer systems, data, and other digital information. For example, cyber security systems may continuously monitor for malicious behavior, such as unusual application programming interface (API) calls, unauthorized deployments, and/or other indicators of compromise to determine whether a certain account or computer has been compromised. Some cybersecurity systems may use third party threat intelligence data, such as malicious domain feeds and the like, to detect anomalies in account and/or workload activity. For example, third party threat intelligence data may include a list of potentially malicious domains, known threat names, IP addresses, and/or other identifiers indicative of computer systems or network components that may be used for malicious traffic, such as those associated with botnets. Cyber security systems may ingest the list of potentially malicious domains and may use the data to identify whether network and/or computer activity is being impacted by any of the potentially malicious domains.

The threat intelligence data provided by third parties to cyber security systems may be aggregated over a period of time, and may include newly identified potentially malicious domains and other threats. However, certain computer systems, domains, IP addresses, or other entries on threat intelligence data lists may include false positives, which may be computer systems, domains, IP addresses, etc. that are inaccurately classified as malicious. This may occur as a result of machine learning algorithms, biases, certain rules implemented by third parties, certain instances of data traffic at a particular domain, and the like. As a result, cyber security systems relying on inaccurate threat intelligence data may inaccurately identify or classify certain network traffic as malicious. This may negatively impact computer systems, domains, or other entities, as non-malicious traffic may be flagged or classified as malicious. In addition, false positives may result in unnecessary manual review of network traffic, thereby reducing overall effectiveness of cybersecurity protections. In some instances, remedial measures may be implemented against non-malicious domains or computer systems, which may also negatively impact domains or computer systems that were inaccurately classified as malicious.

Embodiments of the disclosure include systems and methods for identifying false positives in malicious domain data using network traffic data logs. Certain embodiments may automatically identify or determine that an entry on a list of potentially malicious domains or other threat intelligence data is a false positive, and may implement one or more response actions, such as whitelisting the domain, IP address, or other identifier. In some embodiments, a notification may be generated when a computing instance interacts with a domain or IP address that has been identified or classified as potentially malicious. For example, if a computing instance makes a domain name system (DNS) lookup for a domain name that is identified as being associated with a malware command and control server, embodiments of the disclosure may generate a notification that the computing instance is attempting to communicate with a known malware command and control server. Prior to generating or sending the notification, some embodiments may determine whether the domain name is a false positive. For example, some embodiments may analyze virtual private cloud (VPC) flow log data, or other network traffic data, to determine whether the domain name is malicious or non-malicious. In some embodiments, a confidence score indicative of a likelihood the domain name is malicious or non-malicious may be determined. VPC flow log may be differentiated from and/or unique with respect to generic electronic communication network data because VPC flow log data may be of relatively lower fidelity. For example, VPC flow log data may not include packet headers or other data that may typically be available for network traffic. In addition, VPC flow log data may represent aggregate network traffic over a time period, as opposed to individual communications, and may therefore be less granular or detailed than other forms of network traffic data. For example, VPC flow log data may have an average packet size of data packets over a session instead of individual packet sizes. In addition, a direction of packets may be unknown. As a result, using VPC flow log data to identify false positives may be distinguished over using other forms of network data that may be more specific, robust, and/or granular.

This disclosure relates to, among other things, devices, systems, methods, computer-readable media, techniques, and methodologies for identifying false positives in malicious domain data using network traffic data logs. Certain embodiments automatically determine false positives in threat intelligence data, such as malicious domain lists, and the like. Certain embodiments may determine domain names that are associated with a malware command and control server, and may identify or determine network traffic associated with the malware command and control server to determine any traffic patterns or behaviors that can be classified or identified. In some embodiments, if network activity or data flow is determined to be associated with a malware command and control server, patterns that may be identified may include TCP/UDP port numbers, packet sizes, number of packets, overall number of bytes in a single traffic flow or TCP session, and/or other metrics. Such data or patterns may be used to identify traffic related to botnets and other malware. Similarly, patterns or behaviors of network traffic known to be non-malicious may be used to identify network traffic that is malicious. Certain embodiments may differentiate malicious network traffic from non-malicious, or normal, web traffic using statistical and/or heuristic analysis. A feedback loop may be used to continually improve accuracy of the false positive detection system, which may include feedback from customers, operators, or other users.

Referring to FIG. 1, an example use case 100 for identifying false positives in malicious domain data using network traffic data logs is depicted in accordance with one or more example embodiments of the disclosure. In FIG. 1, one or more false positive detection server(s) 110, or any other server or group of servers, may be used to detect or otherwise identify false positives in threat intelligence data. The threat intelligence data may be received, in one example, from one or more third parties, such as cybersecurity related service providers. Threat intelligence data may include malicious domains, domain identifiers (e.g., domain names of botnet command and control servers, etc.), known threat identifiers, IP addresses that are classified as malicious (referred to as malicious IP addresses), virus signatures, malware file data, URLs, and/or other threat intelligence.

For example, the false positive detection server 110 may receive first threat intelligence data 122 from one or more first third party servers 120. The false positive detection server 110 may receive second threat intelligence data 126 from one or more second third party servers 124. The false positive detection server 110 may receive third threat intelligence data 130 from one or more third third party servers 128. In some embodiments, the false positive detection server 110 may receive threat intelligence data from one source (e.g., a third party source or local source, etc.), while in other instances, the false positive detection server 110 may receive threat intelligence data from a plurality of sources.

The threat intelligence data may include information related to known malicious, or potentially malicious, domains, computer systems, and the like, which can be used by the false positive detection server 110 to detect cybersecurity threats. For example, using the first threat intelligence data 122, the second threat intelligence data 126, and the third threat intelligence data 130, the false positive detection server 110 may analyze network traffic of computers in a network associated with the false positive detection server 110 to determine any malicious behavior or potentially malicious network traffic. The false positive detection server 110 may identify network traffic that is directed to or from any of the domains identified in the respective threat intelligence data, and may take appropriate remedial action, such as flagging the traffic for manual review, preventing or blocking the traffic, and the like.

The first threat intelligence data 122 may include a set of malicious domain names, such as "legitsite1.com," "MrThreat1.001.ch," "MrsThreat1.002.ru," and so forth. The second threat intelligence data 126 may include a set of malicious domain names that includes "gotthem.cn," "legitsite2.cn," "getthem.coldmail.ru," and so forth. The third threat intelligence data may include a set of malicious domain names that includes "stealmyinfo.unsecure.com," "stolenidentity.docs.com," "legitsite3.net," and so forth. The respective domain names in the first threat intelligence data 122, the second threat intelligence data 126, and the third threat intelligence data 130 may be aggregated by respective third party service providers as potentially malicious domain names. Other examples may include domain names, IP addresses, and so forth.

The false positive detection server 110 may be configured to determine or otherwise identify false positives in one or more of the first threat intelligence data 122, the second threat intelligence data 126, and the third threat intelligence data 130. For example, one or more false positive detection modules may be stored at the false positive detection server 100 and may be executed to determine false positives in the threat intelligence data.

To determine false positives in threat intelligence data, an example process flow 140 is presented and may be performed, for example, by the false positive detection server 110. The false positive detection server 110 may include at least one memory that stores computer-executable instructions and at least one processor configured to access the at least one memory and execute the computer-executable instructions to perform various actions or operations, such as one or more of the operations in the process flow 140 of FIG. 1.

At a first block 150, threat intelligence data that includes a domain identifier for a potentially malicious domain may be received. For example, the false positive detection server 110 may receive the first threat intelligence data 122, the second threat intelligence data 126, and/or the third threat intelligence data 130. The threat intelligence data may include a domain identifier, such as a domain name, a domain extension, IP addresses associated with a domain, and/or other domain identifiers. The threat intelligence data may be ingested at the false positive detection server 110. For example, the false positive detection server 110 may receive the threat intelligence data and extract domain information, for example, by parsing the threat intelligence data. In some embodiments, the false positive detection server 110 may receive a set of malicious domain name identifiers from a third party server, such as a subscription service server (e.g., a cybersecurity subscription service server, etc.). The set of malicious domain name identifiers may be in the form of a list or other data file and may include one or more domain identifiers, such as a first domain name identifier and a second domain name identifier.

At block 160, one or more IP addresses associated with the domain identifier may be determined. For example, certain embodiments may use one or more domain name system (DNS) lookup tools and/or lookup logs to determine one or more IP addresses associated with certain domain identifiers. The false positive detection server 110 may determine IP addresses associated with a domain identifier from the threat intelligence data. For example, in the first threat intelligence data 122, the false positive detection server 110 may determine that the "legitsite1.com" domain identifier is associated with a first IP address of 172.16.254.1 and a second IP address of 10.10.17.177. In some embodiments, the false positive detection server 110 may determine a set of IP addresses that includes a first IP address associated with the first domain name identifier in the threat intelligence data. IP addresses may be determined for one or more, or each, of the domain identifiers in the threat intelligence data. In some instances, the threat intelligence data may include IP addresses, in which case the false positive detection server 110 may extract or determine the IP addresses using the threat intelligence data.

At block 170, VPC flow log data associated with the one or more IP addresses may be extracted. For example, for one or more, or each, of the IP addresses determined at block 160, the false positive detection server 110 may extract VPC flow log data that is associated with the respective IP addresses. A VPC may be a logically isolated section of a cloud computing environment where resources may be launched in a specific virtual network. Network traffic through the VPC may be monitored and/or captured in one or more VPC flow logs.

For example, VPC flow log data corresponding to network traffic directed to or from the respective IP addresses may be extracted from a set of flow log data. The extracted VPC flow log data may be for a certain period of time, such as a preceding 24 hours, 1 week, etc. The false positive detection server 110 may determine a first VPC flow log for a first VPC that includes network traffic corresponding to the first IP address. The first VPC flow log may include flow log records representing network flow for one or more, or each, network interface in the first VPC. The false positive detection server 110 may determine a second VPC flow log for a second VPC that includes network traffic corresponding to the second IP address. The second VPC flow log may include flow log records representing network flow for one or more, or each, network interface in the second VPC.

At block 180, the IP addresses may be determined to be associated with non-malicious traffic using the VPC flow log data. For example, certain features or characteristics of the VPC flow log data may be extracted. Features or characteristics that may be determined or extracted using the VPC flow log data may include source IP address data, destination IP address data, transmission protocol data, source port data, destination port data, packet transmission data, and/or other features or characteristics.

The extracted features or characteristics may be analyzed and/or compared to network traffic features or characteristics, which may include patterns and/or behaviors, of known non-malicious network traffic. The results of the comparison and/or analysis may be used to determine whether the VPC flow log data represents network behavior that is sufficiently close to, or substantially matches, network traffic of normal or known non-malicious network behavior, such as network data represented by VPC flow log data corresponding to whitelisted IP addresses or domains. For example, some botnet command and control servers may use specific TCP/UDP port numbers, and as a result, port numbers may be used to identify traffic related to the botnets. In another example, botnet command and control servers may have specific patterns of traffic, such as patterns related to packet size(s), number of packets, an overall number of bytes in a single traffic flow or TCP session, etc. In another example, traffic associated with some botnet command and control servers may be distinguishable or otherwise identified using statistical or heuristic-based analysis (e.g., if a file does not have a signature certificate or an incorrect signature certificate, etc.).

In some embodiments, the false positive detection server 110 may determine VPC flow log data for non-malicious network traffic, such as VPC flow log data for whitelisted domains or other known non-malicious entities. The false positive detection server 110 may determine, in one example, source IP address data, destination IP address data, transmission protocol data, source port data, destination port data, packet transmission data, and/or other characteristics or features of known non-malicious VPC flow log data. Using the extracted data, the false positive detection server 110 may determine patterns or behaviors of non-malicious network traffic, and may use the patterns or behavior as a baseline against which to compare the features of the potentially malicious network traffic.

In some instances, the false positive detection server 110 may optionally generate a first data object, such as a first vector, representative of the first VPC flow log, and a second data object, such as a second vector, representative of the second VPC flow log, and may use one or more clustering algorithms to determine a similarity between the respective vectors. For example, a distance between the vectors may be determined and used to determine whether the network traffic is similar or different. Based at least in part on the distance or determined similarity, the network traffic may be determined to be likely classified as malicious or likely classified as non-malicious.

In the example of FIG. 1, the false positive detection server 110 may determine that VPC flow log data corresponding to IP addresses associated with the "legitsite1.com" entry in the first threat intelligence data 122 is sufficiently similar to known non-malicious network traffic behavior. As a result, the false positive detection server 110 may determine that the IP addresses associated with the "legitsite1.com" entry are associated with non-malicious network traffic. Similarly, the false positive detection server 110 may determine that VPC flow log data corresponding to IP addresses associated with the "legitsite2.cn" entry in the second threat intelligence data 126 is sufficiently similar to known non-malicious network traffic behavior. As a result, the false positive detection server 110 may determine that the IP addresses associated with the "legitsite2.cn" entry are associated with non-malicious network traffic. The false positive detection server 110 may determine that VPC flow log data corresponding to IP addresses associated with the "legitsite3.net" entry in the third threat intelligence data 130 is sufficiently similar to known non-malicious network traffic behavior. As a result, the false positive detection server 110 may determine that the IP addresses associated with the "legitsite3.net" entry are associated with non-malicious network traffic.

In some embodiments, a confidence score may be determined, for example by the false positive detection server 110, indicative of a probability that certain network traffic or VPC flow log data corresponds to malicious or non-malicious traffic. Confidence scores may be determined based at least in part on similarity or dissimilarity to known malicious or non-malicious network traffic, or, in some embodiments, based at least in part on a distance between vectors or clusters. A confidence score threshold (e.g., greater than or equal to 80%, 85%, 90%, etc.) may be used to determine whether to classify network traffic as malicious or non-malicious using the determined or calculated confidence score.

At block 190, a whitelist notification may be generated for the domain identifier. For example, the false positive detection server 110 may generate a first whitelist notification 132 for "legitsite1.com," a second whitelist notification 134 for "legitsite2.cn," and a third whitelist notification 136 for "legitsite3.net." The whitelist notifications may be alerts, messages, or other forms of notifications that flag the respective domains as non-malicious, so as to avoid unintentional disruption to network traffic, and to potentially reduce false alerts. In some embodiments, domains for which whitelisted notifications are generated may be automatically whitelisted or allowed to operate without interference, while in other embodiments, domains for which whitelisted notifications are generated may be flagged for manual review and approval for whitelisting. User feedback, for example from manual review, may be used as a feedback loop to improve accuracy of the optional confidence scores generated by the false positive detection server 110. If the network traffic is determined to be similar to known malicious network traffic, the false positive detection server 110 may optionally determine a confidence score for the specific IP addresses and/or domain corresponding to a likelihood that the domain is malicious, and/or may take no action or implement a response action, such as generating a notification of certain network traffic.

Embodiments of the disclosure may include systems and methods to identify false positives in malicious domain data using network traffic data logs, and may include one or more modules that can be used to analyze various characteristics of network traffic. Some embodiments may output potential false positives identified in threat intelligence data, along with confidence scores of the respective false positives.

Example embodiments of the disclosure provide a number of technical features or technical effects. For example, in accordance with example embodiments of the disclosure, certain embodiments of the disclosure may automatically analyze network traffic, identify false positives, determine patterns of malicious and/or non-malicious network traffic, and automatically implement one or more remedial actions to address identified false positives. As a result of improved functionality, alert fatigue may be reduced, signal to noise ratios of alerts may be improved, and malicious network traffic may be more accurately determined. Embodiments of the disclosure may improve computing efficiency and bandwidth by identifying false positives, thereby reducing a number of false alerts generated by threat or intrusion detection systems. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
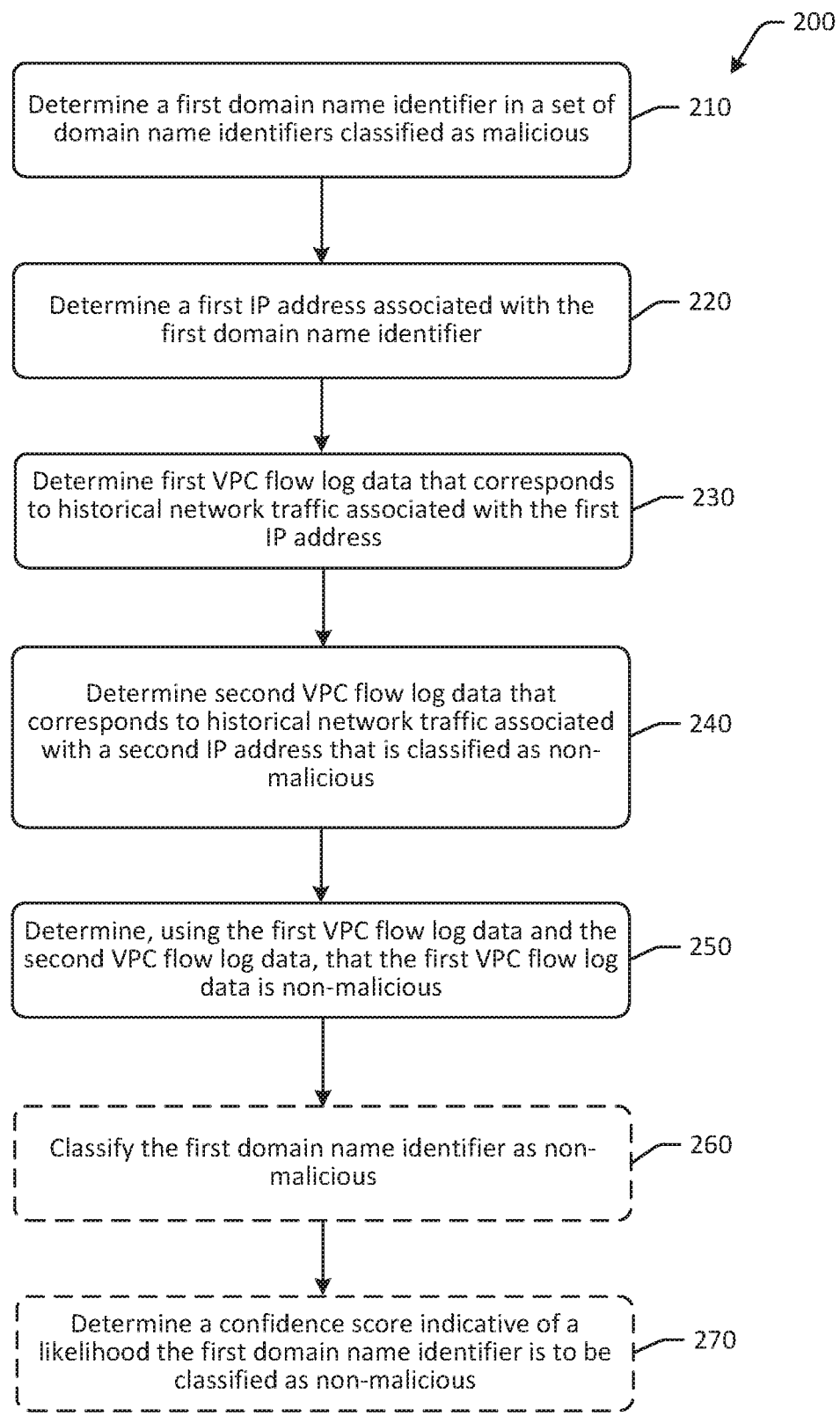
FIG. 2 is a schematic illustration of an example process flow for identifying false positives in malicious domain data using network traffic data logs in accordance with one or more example embodiments of the disclosure.

FIG. 2 depicts an example process flow 200 for identifying false positives in malicious domain data using network traffic data logs in accordance with one or more example embodiments of the disclosure. While example embodiments of the disclosure may be described in the context of VPC flow log data and domains, it should be appreciated that the disclosure is more broadly applicable to any type of network traffic data and network identifiers. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a first domain name identifier in a set of domain name identifiers classified as malicious. For example, a remote server may receive (e.g., from another computer system or service provider, etc.) a set of domain name identifiers for domains that have been classified as malicious. The domain name identifiers may identify domains and may include domain extensions, domain names, and/or other identifiers. In some embodiments, domains classified as malicious may be domains that are potentially malicious, or domains that may be malicious. The set of domain name identifiers may be input as a feed to an intrusion detection system or other computer system. In some embodiments, the set of domain name identifiers may be part of threat intelligence data and may be associated with certain IP addresses, which may be included as part of the threat intelligence data.

At block 220 of the process flow 200, computer-executable instructions stored on a memory of a device may be executed to determine a first IP address associated with the first domain name identifier. For example, a remote server may determine or otherwise identify one or more IP addresses associated with the first domain name identifier. In some embodiments, the IP addresses may be identified using a DNS lookup tool or a DNS lookup log, while in other embodiments the IP addresses may be extracted from threat intelligence data, local datastores, or another source.

At block 230 of the process flow 200, computer-executable instructions stored on a memory of a device may be executed to determine first VPC flow log data that corresponds to historical network traffic associated with the first IP address. For example, a remote server may determine network traffic data associated with the first IP address that is associated with the first domain name identifier. The network traffic data may be in the form of VPC flow log data, and may be determined by searching a database of VPC flow log data or another network traffic database. VPC flow log data may be determined for a predetermined timeframe, such as a preceding number of hours, days, weeks, etc. In some embodiments, VPC flow log data corresponding to multiple, or each, IP addresses associated with the domain name identifier may be determined. In such instances, respective network traffic data may be identified for each of the IP addresses and/or domain name identifiers.

The first VPC flow log data may represent information about the IP traffic going to and from network interfaces in the first VPC. The first VPC flow log data may include flow log records. Flow log records may represent a network flow in a flow log. Each record may capture the network flow for a specific firewall policy, for a specific capture window. Firewall policies may correspond to different values that specify the source, destination, and protocol for an IP flow. The capture window may be a duration of time during which the flow logs service aggregates data before publishing flow log records.

At block 240, computer-executable instructions stored on a memory of a device may be executed to determine second VPC flow log data that corresponds to historical network traffic associated with a second IP address that is classified as non-malicious. For example, the remote server may determine network traffic data associated with one or more IP addresses that is known to be non-malicious. For example, the network traffic associated with a domain that is whitelisted may be determined.

In some embodiments, VPC flow log data may be used to determine network traffic characteristics or behaviors of network traffic that is known to be non-malicious. For example, network traffic data, such as that in the form of VPC flow log data, may be determined for one or more IP addresses or domains that are known to be non-malicious. Using the network traffic data, trends, behaviors, and/or features may be determined so as to determine or otherwise identify characteristics of non-malicious network traffic. For example, patterns or behaviors of non-malicious traffic related to ports, IP address, protocols, transmission-specific data (e.g., number of packets, bytes, etc.) may be determined and used to identify similar network traffic.

At block 250, computer-executable instructions stored on a memory of a device may be executed to determine, using the first VPC flow log data and the second VPC flow log data, that the first VPC flow log data is non-malicious. For example, the remote server may determine, based at least in part on the second VPC flow log data and/or determined patterns or behaviors of known non-malicious network traffic, that the first VPC flow log data is to be classified as non-malicious. In some embodiments, a comparison may be performed to determine a level of similarity between the first VPC flow log data and the second VPC flow log data and/or other patterns of known non-malicious network traffic. In other embodiments, the first VPC flow log data and/or the second VPC flow log data may be converted to data objects, such as vectors, and mapped so as to determine a distance between the data objects. The distance may be representative of a similarity between the two data objects. For example, the less the distance, the more similar the data objects may be. In some embodiments, multiple data objects representing multiple VPC flow logs may be mapped to determine clusters of known non-malicious and/or malicious network traffic, and distance to either of the respective clusters may be used to determine whether to classify a certain data object and/or corresponding network traffic data as malicious or non-malicious.

In some embodiments, confidence scores may be used to determine whether to classify network traffic and/or corresponding IP addresses or domains as malicious or non-malicious. For example, a first confidence score threshold may be used to determine whether to automatically classify an IP address or domain as malicious or non-malicious, while a second (or the first) confidence score threshold may be used to determine whether to flag a domain or IP address for manual review.

At optional block 260, computer-executable instructions stored on a memory of a device may be executed to classify the first domain name identifier as non-malicious. For example, the remote server may determine that the first VPC flow log data is sufficiently similar to the second VPC flow log data or known non-malicious network traffic patterns, and may therefore generate a notification that the first domain name identifier is to be classified as non-malicious and/or that the first domain name identifier is a false positive. In some embodiments, false positives may be reviewed manually before being whitelisted, while in other embodiments, false positives may automatically be whitelisted.

At optional block 270, computer-executable instructions stored on a memory of a device may be executed to determine a confidence score indicative of a likelihood the first domain name identifier is to be classified as non-malicious. For example, the remote server may determine a confidence score corresponding to the predicted classification of non-malicious network traffic. The confidence score may be, in one example, determined using a distance between data objects (e.g., vectors, etc.), where the less the distance, the higher the confidence, and so forth.

In some embodiments, a machine learning model may be used in order to improve subsequent classifications. For example, after a false positive is manually reviewed, an indication or other signal of whether the classification was correct may be sent to the machine learning model to train the machine learning model for subsequent classifications. For example, the remote server may determine, using a machine learning model, a probability value indicative of a likelihood an IP address, domain, or other computer system identifier is associated with non-malicious network traffic. The probability value may be determined to satisfy a confidence score threshold value, and a user feedback indication that the first IP address is associated with non-malicious network traffic may be determined and/or received. The machine learning model may be retrained using the user feedback indication.

False positive classifications having a confidence score of 90% or greater (in one example) may be determined to be false positives. Different confidence score thresholds may be used for different classifications. In one example, false positive classifications (e.g., classifications indicating that a domain is inaccurately reported as malicious, etc.) may have a relatively higher confidence score threshold than accurate classifications (e.g., instances where the threat intelligence data is correct, etc.). As a result, false positive identification may be improved.

Figure 3:
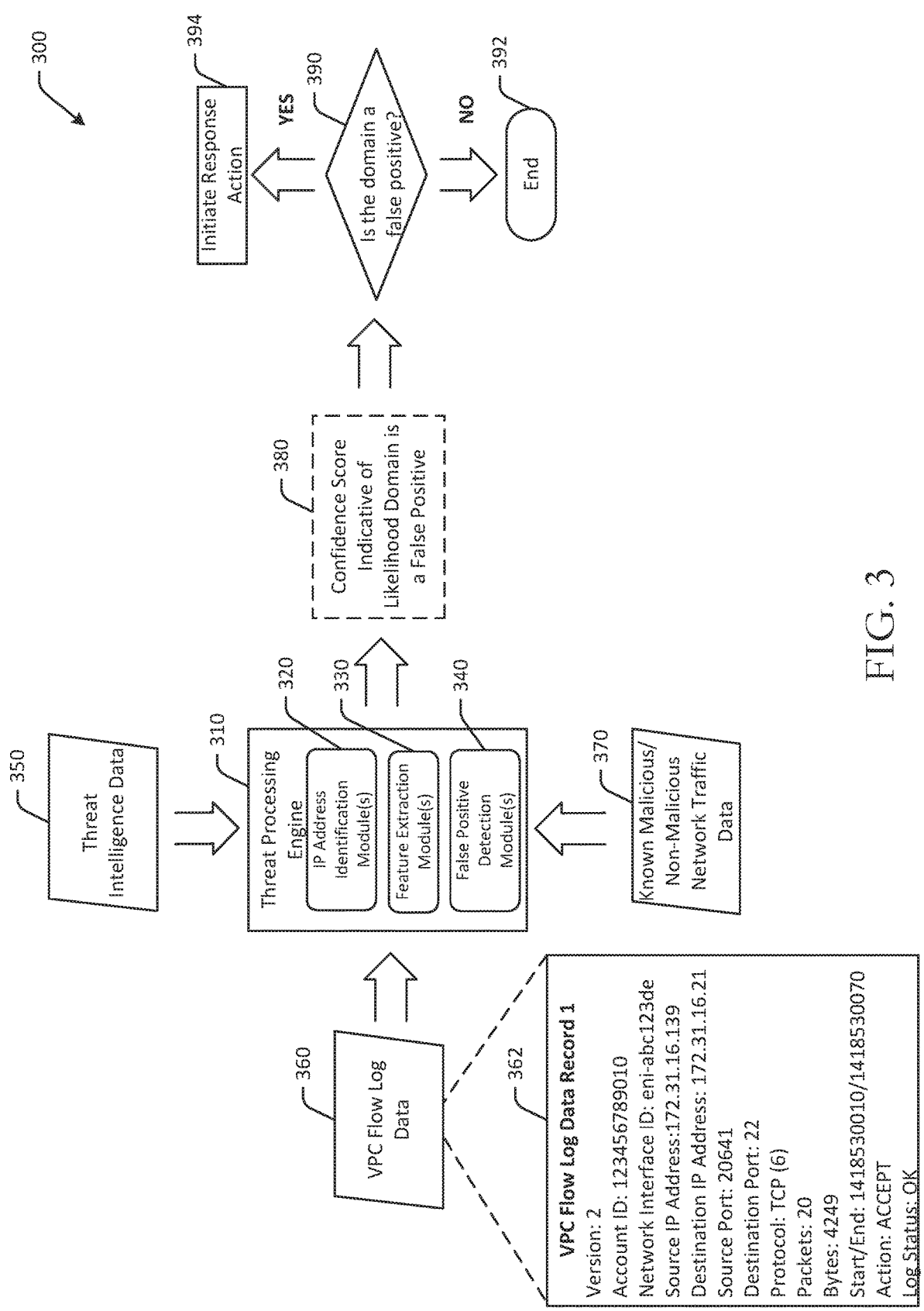
FIG. 3 is a schematic illustration of an example hybrid data and process flow for identifying false positives in malicious domain data using network traffic data logs in accordance with one or more example embodiments of the disclosure.

FIG. 3 is a schematic illustration of an example hybrid data and process flow 300 for identifying false positives in malicious domain data using network traffic data logs in accordance with one or more example embodiments of the disclosure. Different embodiments may include different, additional, or fewer inputs or outputs than those illustrated in the example of FIG. 3.

In FIG. 3, an example hybrid data and process flow 300 is schematically depicted. A threat processing engine 310 may be configured to determine or otherwise identify false positives in threat intelligence data. The threat processing engine 310 may be stored at and/or executed by one or more remote servers. The threat processing engine 310 may include one or more modules and/or algorithms, and may be configured to determine whether entries in threat intelligence data are false positives using network traffic data logs.

For example, the threat processing engine 310 may include one or more IP address identification modules 320, one or more feature extraction modules 330, and/or one or more false positive detection modules 340. Additional or fewer, or different, modules may be included. The IP address identification module(s) 320 may be configured to extract or determine domain identifiers, for example, from threat intelligence data service providers. For example, the IP address identification module(s) 320 may be configured to ingest or parse threat intelligence data and determine one or more domain identifiers or other identifiers of potentially malicious domains. In some embodiments, the domain identifiers may be provided to the IP address identification module(s) 320 locally. The IP address identification module(s) 320 may be configured to determine a set of one or more IP addresses that correspond to, or are otherwise associated with, one or more of the domain identifiers that have been provided. For example, IP addresses associated with a first domain identifier may be determined using a DNS lookup tool, a DNS lookup log, or another source. In some embodiments, the IP address identification module(s) 320 may extract IP address information from threat intelligence data.

The feature extraction module(s) 330 may be configured to process and/or analyze VPC flow log data to determine one or more features. In some instances, the feature extraction module(s) 330 may be configured to identify VPC flow log data corresponding to, or otherwise associated with, certain IP addresses, and may extract one or more values from the VPC flow log data. For example, the feature extraction module(s) 330 may be configured to determine ports, IP addresses, protocols, transmission lengths, packet sizes, and the like that may appear in VPC flow log data. In some embodiments, the feature extraction module(s) 330 may be configured to determine patterns and/or behaviors of network traffic that is known to be malicious and/or non-malicious, which can be used to evaluate subsequent network traffic. Feature extraction module(s) 330 may include one or more algorithms configured to detect at least one of botnet related command and control server identifiers, malware infected computers, and/or the like.

The false positive detection module(s) 340 may be configured to analyze and/or process VPC flow log data associated with IP addresses and/or domain identifiers to determine whether a domain identifier and/or IP address is a false positive. In some embodiments, network traffic behavior, as determined using VPC flow log data, may be compared to the network traffic behavior of known non-malicious domains (and/or malicious domains) to determine an extent of similarity between the respective network traffic. Based at least in part on the similarity (or difference), a determination may be made as to whether to classify network traffic (and/or its corresponding domains or IP addresses) as malicious or non-malicious.

The threat processing engine 310 may receive one or more inputs that may be used to determine false positives. For example, the threat processing engine 310 may receive one or more of threat intelligence data 350 that may be from third parties and may include identifiers of potentially malicious domains, VPC flow log data 360 that may include network traffic data associated with respective IP addresses for domains in the threat intelligence data 350, and/or known malicious and/or non-malicious network traffic data 370 that may include determined characteristics or patterns (e.g., port numbers used, etc.) of malicious or non-malicious network traffic. Known malicious network traffic data may include data corresponding to network traffic that has been manually reviewed and/or identified as malicious, whereas known non-malicious network traffic data may include data corresponding to network traffic that has been manually reviewed and/or identified as non-malicious. In some embodiments, known malicious network traffic data may be captured as empirical data by executing malicious programs, accessing malicious domains, etc. in a controlled computing environment, and monitoring the network traffic.

The threat processing engine 310 may process the threat intelligence data 350 to determine domain identifiers that may be potentially malicious. The threat processing engine 310 may determine one or more IP addresses associated with individual domain identifiers in the threat intelligence data 350. After the IP addresses are determined, the threat processing engine 310 may query the VPC flow log data 360 to identify and/or determine VPC flow log data associated with the respective IP addresses.

The VPC flow log data associated with an IP address may include flow log records. An example flow log record 362 in which network traffic was allowed is illustrated in FIG. 3. The flow log record 362 may include data such as one or more of a flow log version number, an account identifier, an interface identifier (e.g., the identifier of the network interface for which the log stream applies, etc.), a source IP address, a destination IP address, a source port of the traffic, a destination port of the traffic, the protocol (e.g., TCP/UDP, etc.) number of the traffic, the number of packets transferred during the capture window, the number of bytes transferred during the capture window, the time of the start of the capture window, the time of the end of the capture window, an action identifier associated with the traffic (e.g., accept, reject, etc.), the logging status of the flow log (e.g., OK, no traffic, skipped data/error, etc.), and/or other data.

In the example of FIG. 3, the flow log version of the flow log record 362 may be version 2, the account identifier may be 123456789010, the interface identifier may be eni-abc123de, the source IP address may be 172.31.16.139, the destination IP address may be 172.31.16.21, the source port of the traffic may be 20641, the destination port of the traffic may be 22, the protocol number may be 6 (indicating TCP), the number of packets transferred during the capture window may be 20, the number of bytes transferred during the capture window may be 4249, the time of the start of the capture window may be 1418530010 (in Unix seconds), the time of the end of the capture window may be 1418530070 (in Unix seconds), the action identifier may indicate accepted, and the logging status of the flow log may indicate that the status is OK.

The threat processing engine 310 may determine known malicious and/or non-malicious network traffic data 370, which may be indicative of known malicious and/or non-malicious network traffic. The threat processing engine 310 may use one or more, or a plurality, of flow log records from VPC flow log data 360, to determine whether the network traffic associated with a particular IP address and/or domain is to be categorized or classified as malicious or non-malicious. For example, the threat processing engine 310 may determine a pattern or behavior of network traffic, such as via feature extraction, associated with the domain and/or IP address, and may determine whether the pattern or behavior is similar to known malicious network traffic or known non-malicious network traffic. For example, the threat processing engine 310 may compare one or more features of the VPC flow log data, such as port number data, to determine whether the VPC flow log data corresponds to malicious or non-malicious network traffic. In some instances, analysis of known malicious network traffic may result in identification of certain source or destination ports that are frequently used, which may then be used to determine whether subsequent network traffic is malicious (e.g., whether the same ports are used, etc.). For example, the threat processing engine 310 may compare first source port data, first destination port data, first packet size data, and/or first session duration data from the VPC flow log data 360 to second source port data, second destination port data, second packet size data, and/or second session duration data from the known malicious and non-malicious network traffic data 370 (or corresponding VPC flow log data).

Using one or more algorithms or modules, the threat processing engine 310 may optionally determine a confidence score 380 indicative of a likelihood that the domain is a false positive, or that the domain is associated with non-malicious network traffic. In some embodiments, the confidence score 380 may be indicative of a likelihood that the domain is associated with malicious network traffic. The confidence score 380 may be determined based at least in part on a level of similarity, which may be determined based on a distance between vectors in one example, between the VPC flow log data and the known network traffic behavior and patterns for either malicious or non-malicious network traffic.

The threat processing engine 310 may output a determination as to whether the domain is to be classified as malicious or non-malicious. As illustrated in FIG. 3, at determination block 390, the threat processing engine 310 may make a determination as to whether the domain is a false positive. If the domain is determined to be a false positive at determination block 390, a response action may be initiated at block 394. For example, the domain may be whitelisted or flagged for manual review. If the domain is determined not to be a false positive at determination block 390, the process may end at block 392. In some embodiments, a determination may be made that the domain is malicious and is to be classified as malicious, rather than, or in addition to, determination that the domain is not a false positive. In instances where the confidence score 380 is determined, a confidence score threshold may be used to determine whether the domain is a false positive at determination block 390.

Figure 4:
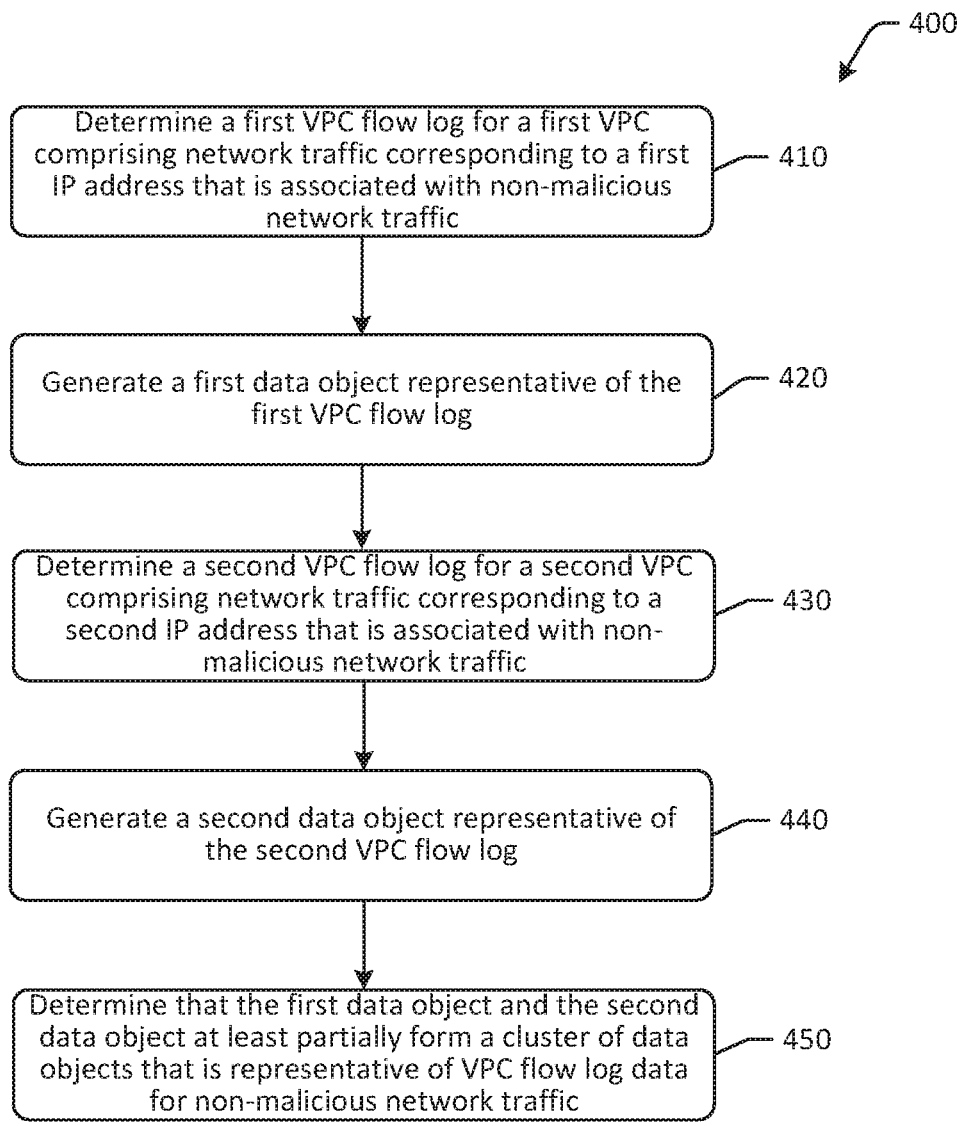
FIGS. 4-5 schematically illustrate an example use case and an example process flow for using clustering techniques to identify false positives in accordance with one or more example embodiments of the disclosure.
Figure 5:
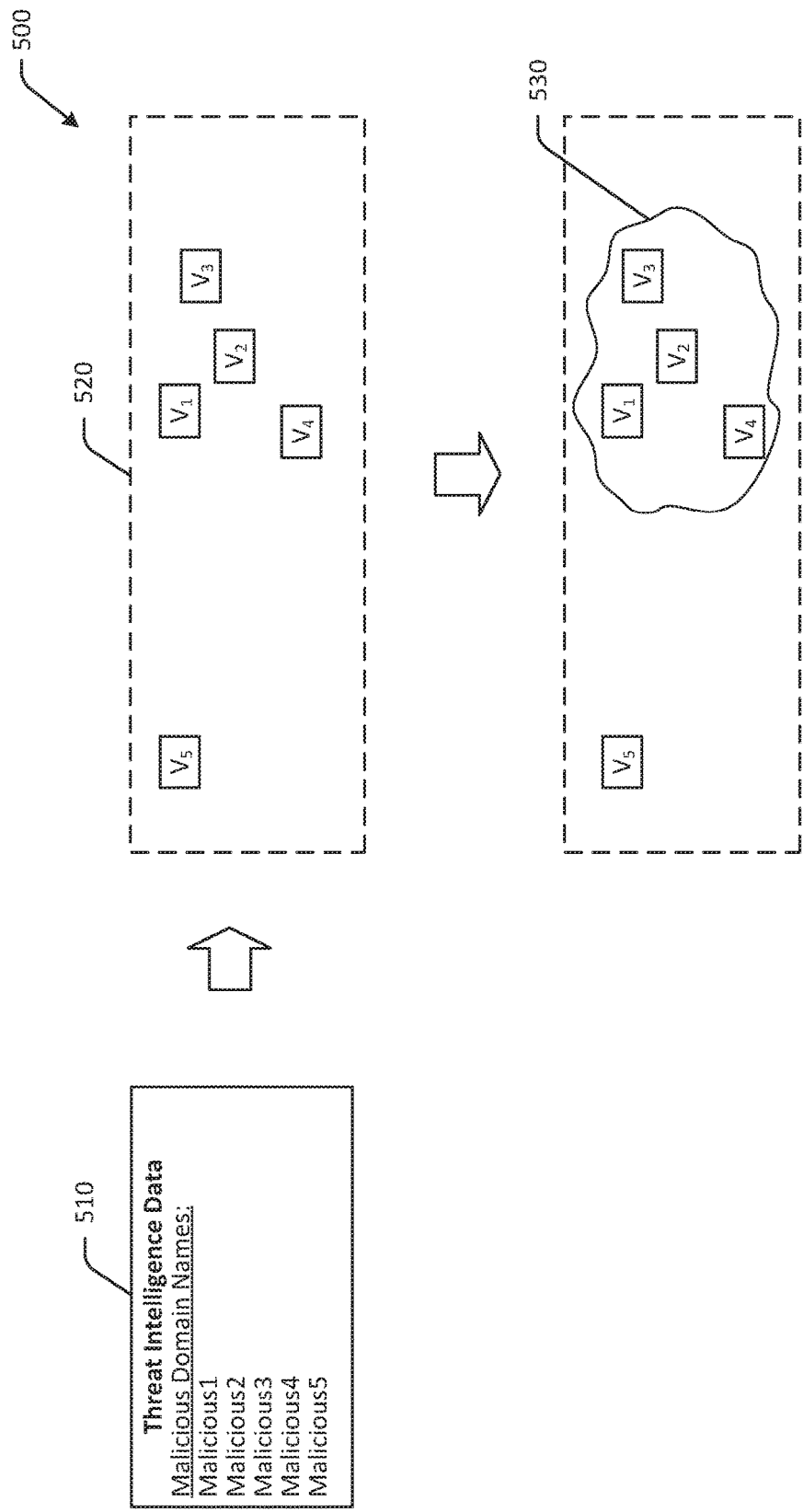

FIGS. 4-5 schematically illustrate an example use case and an example process flow for using clustering techniques to identify false positives in accordance with one or more example embodiments of the disclosure.

In FIG. 4, an example process flow 400 for generating clusters of data objects is illustrated. At block 410, a first VPC flow log for a first VPC comprising network traffic corresponding to a first IP address that is associated with non-malicious network traffic may be determined, for example, by one or more modules executed at a remote server. At block 420, a first data object representative of the first VPC flow log may be determined, for example, by the remote server. The first data object may be a vector in one embodiment. The first data object may be generated or determined using one or more features extracted from the first VPC flow log, such as user spend associated with a user account identifier, recent account activity associated with the user account identifier, etc. At block 430, a second VPC flow log for a second VPC comprising network traffic corresponding to a second IP address that is associated with non-malicious network traffic may be determined, for example, by the remote server. At block 440, a second data object representative of the second VPC flow log may be generated. The second data object may be a vector. At block 450, the first data object and the second data object may be determined to at least partially form a cluster of data objects that is representative of VPC flow log data for non-malicious network traffic. Although the first data object and the second data object may both be associated with non-malicious network traffics, the respective data objects may have different features, such as ports, etc., and may therefore occupy similar, but different, vector spaces. Clusters may be determined based at least in part on distances between vectors or other data objects, and may be determined relative to distances between other data objects in a set of data.

In FIG. 5, an example use case 500 for implementing the process flow 400 is depicted. For example, one or more remote servers may receive or determine a set of malicious domains, and may determine respective associated IP addresses. Using the associated IP addresses, VPC flow logs corresponding to the IP addresses may be determined for a certain time period. The VPC flow logs may be processed so as to extract one or more features, such as port numbers, packet size, transmission length, etc. The extracted features may be used to generate respective vectors that represent the VPC flow logs. In some embodiments, clustering may be used to determine or otherwise identify similar data objects, such as vectors, which may represent network traffic data.

In some embodiments, network traffic data for a certain period of time may be clustered to determine whether there are any outliers, which may indicate the presence of malicious or non-malicious network traffic. In such an embodiment, there may not be predetermined patterns or behaviors of known non-malicious network traffic data needed to identify potential malicious network traffic. In other embodiments, historical clustering data may be used to determine whether new network traffic data is malicious. For example, clusters of historical known non-malicious network traffic data may be used to determine whether subsequent network traffic data is similar or different (as determined by distance in one example) to the historical clustered data.

For example, threat intelligence data 510 may include five domain identifiers. IP addresses associated with each of the five domain identifiers may be determined, and the corresponding VPC flow log data may be determined by, for example, a remote server. The respective VPC flow log data may be converted to vector form (or to another suitable data object), and may optionally be mapped in a vector space 520. For example, $V_1$ may correspond to the first malicious domain name, $V_2$ may correspond to the second malicious domain name, $V_3$ may correspond to the third malicious domain name, $V_4$ may correspond to the fourth malicious domain name, and $V_5$ may correspond to the fifth malicious domain name in FIG. 5.

The resulting vectors may be processed to determine whether any clusters are present. Clustering may be performed based at least in part on distances between vectors. For example, a distance function may be selected for a clustering algorithm. In certain example embodiments, the clustering algorithm may be a K-medoids clustering algorithm. The distance function may be a Manhattan distance, a Euclidean distance, or the like. The distance function may be a linear or a non-linear distance function that calculates distances between vectors based at least in part on one or more, or a combination of two or more, vector properties. Two or more properties may be combined using any suitable regular expression that may include multiplication, addition, subtraction, and/or division operations to obtain a distance function.

In the example of FIG. 5, based at least in part on the distances between vectors $V_1$, $V_2$, $V_3$, and $V_4$, the group of $V_1$, $V_2$, $V_3$, and $V_4$ may be determined to form a cluster 630. Based at least in part on a distance between the cluster 630 and the outlier $V_5$, $V_5$ may be determined to be network traffic that is the opposite of the network traffic represented by the cluster 630. For example, if the cluster 630 is determined to represent non-malicious network traffic, the outlier may be determined to represent malicious network traffic, whereas if the cluster 630 is determined to represent malicious network traffic, the outlier may be determined to represent non-malicious network traffic. Accordingly, groups or sets of VPC flow log data may be clustered to determine whether any outliers are present, and if so, whether they represent certain types of network traffic.

Figure 6:
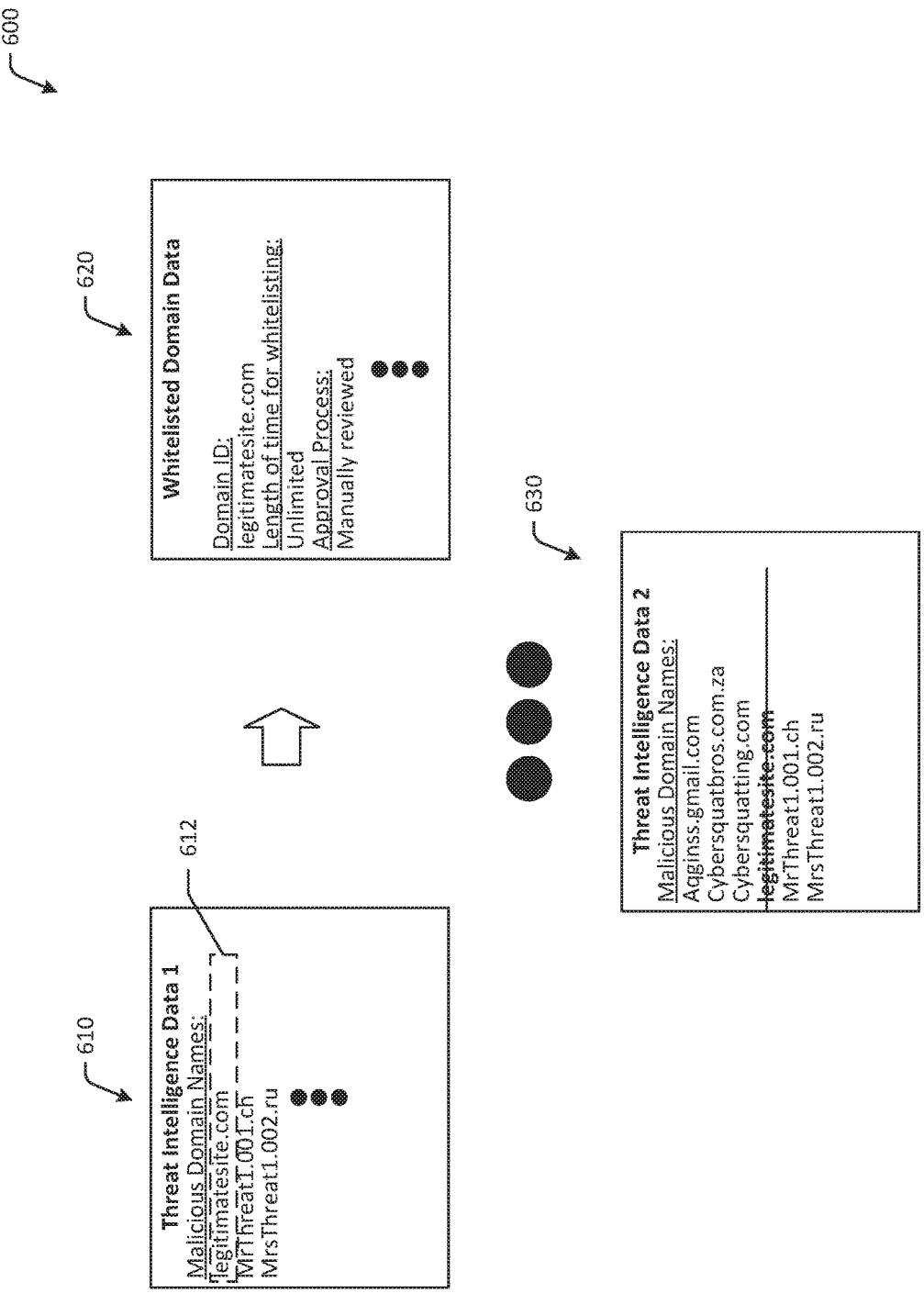
FIG. 6 is a schematic illustration of example use cases for response actions in accordance with one or more example embodiments of the disclosure.

FIG. 6 is a schematic illustration of example use cases 600 for response actions in accordance with one or more example embodiments of the disclosure. For example, in FIG. 6, a threat detection system may receive first threat intelligence data 610. The threat intelligence data 610 may include a number of malicious domain names, which may include "legitimatesite.com" as an entry 612. A threat detection system, as described in accordance with embodiments herein, may determine that the "legitimatesite.com" domain identifier is a false positive, and may determine that the domain identifier "legitimatesite.com" is to be whitelisted. Accordingly, as illustrated in whitelisted domain data 620, the domain identifier "legitimatesite.com" may be classified as non-malicious and/or whitelisted, such that related network traffic is not flagged or otherwise interrupted. In some embodiments, a whitelist indication for the domain name identifier may be generated. The whitelisting may be for a certain length of time (e.g., a certain amount of hours, days, unlimited, etc.), and may include an indication of the approval process for whitelisting the domain identifier. This may be because a status or classification of a domain may change over time. For example, heuristics such as updates, network traffic changes, domain validity changes, ownership changes, and so forth may impact the network traffic associated with an IP address and/or domain, thereby impacting the classification or categorization of a domain as malicious or non-malicious. In the example of FIG. 6, the domain may be whitelisted for an unlimited length of time as a result of manual review and approval of the domain identifier. Because the domain identifier is whitelisted, if the domain identifier appears or is otherwise present on subsequent threat intelligence data, such as second threat intelligence data 630, the threat detection system may automatically determine that the domain identifier is a false positive (as represented by strikethrough for illustration purposes in FIG. 6). Accordingly, false positives in threat intelligence data may be reduced, and network traffic data for non-malicious traffic may not be affected.

Figure 7:
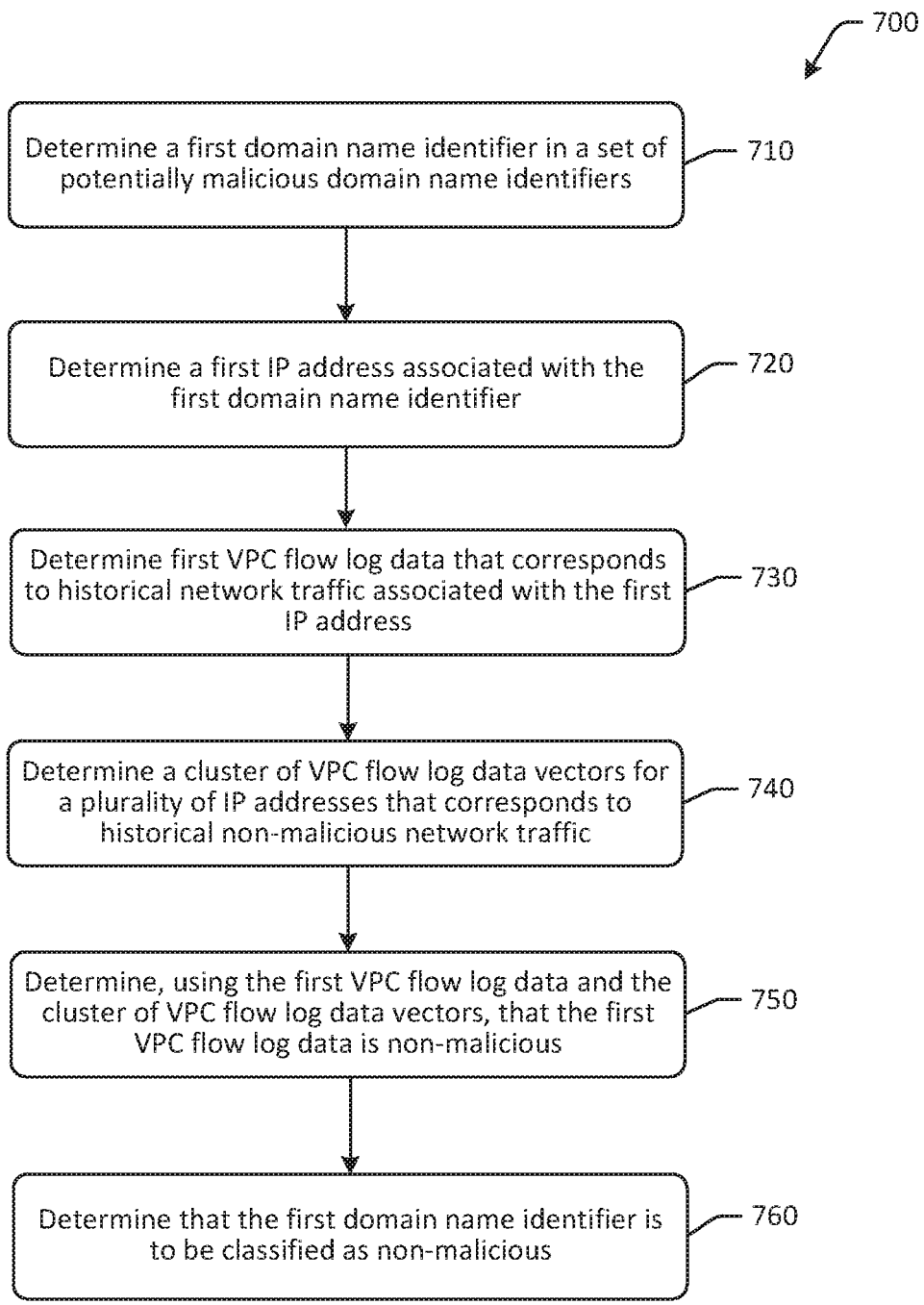
FIG. 7 is a schematic illustration of an example process flow for identifying false positives in malicious domain data using network traffic data logs in accordance with one or more example embodiments of the disclosure.

FIG. 7 depicts an example process flow 700 for identifying false positives in malicious domain data using network traffic data logs in accordance with one or more example embodiments of the disclosure. While example embodiments of the disclosure may be described in the context of domain identifiers, it should be appreciated that the disclosure is more broadly applicable to any type of network traffic and/or computer system identifiers. Some or all of the blocks of the process flows in this disclosure may be performed in a distributed manner across any number of devices. The operations of the process flow 700 may be optional and may be performed in a different order.

At block 710 of the process flow 700, computer-executable instructions stored on a memory of a device, such as a remote server or a user device, may be executed to determine a first domain name identifier in a set of potentially malicious domain name identifiers. For example, a remote server may receive (e.g., from another computer system or service provider, etc.) threat intelligence data that may include a set of domain name identifiers for domains that have been classified as malicious (or potentially malicious). The domain name identifiers may identify domains and may include domain extensions, domain names, and/or other identifiers. In some embodiments, domains classified as malicious may be domains that are potentially malicious, or domains that may be malicious. The set of domain name identifiers may be input as a feed to an intrusion detection system or other computer system. In some embodiments, the set of domain name identifiers may be part of threat intelligence data and may be associated with certain IP addresses, which may be included as part of the threat intelligence data.

At block 720 of the process flow 700, computer-executable instructions stored on a memory of a device may be executed to determine a first IP address associated with the first domain name identifier. For example, a remote server may determine or otherwise identify one or more IP addresses associated with the first domain name identifier. In some embodiments, the IP addresses may be identified using a DNS lookup tool or a DNS lookup log, while in other embodiments the IP addresses may be extracted from threat intelligence data, local datastores, or another source.

At block 730 of the process flow 700, computer-executable instructions stored on a memory of a device may be executed to determine first VPC flow log data that corresponds to historical network traffic associated with the first IP address. For example, a remote server may determine network traffic data associated with the first IP address that is associated with the first domain name identifier. The network traffic data may be in the form of VPC flow log data, and may be determined by searching a database of VPC flow log data or another network traffic database. VPC flow log data may be determined for a predetermined timeframe, such as a preceding number of hours, days, weeks, etc. In some embodiments, VPC flow log data corresponding to multiple, or each, IP addresses associated with the domain name identifier may be determined. The first VPC flow log data may represent information about the IP traffic going to and from network interfaces in the first VPC. The first VPC flow log data may include flow log records, such as the example represented in FIG. 3.

At block 740, computer-executable instructions stored on a memory of a device may be executed to determine a cluster of VPC flow log data vectors for a plurality of IP addresses that corresponds to historical non-malicious network traffic. For example, the remote server may identify a cluster of data objects, such as vectors, that represent a number of IP addresses corresponding to non-malicious network traffic. The cluster of VPC flow log data vectors or other data objects may be determined using a suitable clustering algorithm, such as a connectivity model, a centroid model, a distribution model, a density model, K means clustering, and the like.

At block 750, computer-executable instructions stored on a memory of a device may be executed to determine, using the first VPC flow log data and the cluster of VPC flow log data vectors, that the first VPC flow log data is non-malicious. For example, the remote server may determine a distance between a vector representing the first VPC flow log data and the cluster of VPC flow log data vectors. The distance may be used to determine whether the vector is similar to the cluster, which if so, may indicate that the first VPC flow log data is non-malicious, like the data represented by the cluster.

In one example, to determine the distance between the first data object, or the vector representing the first VPC flow log data, and the cluster of vectors or other data objects that is representative of the VPC flow log data for non-malicious network traffic, certain embodiments may compare source IP address data, destination IP address data, transmission protocol data, source port data, destination port data, packet transmission data, and/or other features to determine a distance value. The distance may be compared to a threshold value. For example, if the distance is equal to or less than a threshold value, meaning that the vector is similar to the cluster, the network traffic associated with the first VPC flow log data may be determined to be non-malicious network traffic. Likewise, if the distance is equal to or greater than the threshold value, meaning relatively more dissimilar, the network traffic may be determined to be malicious network traffic.

At block 760, computer-executable instructions stored on a memory of a device may be executed to determine that the first domain name identifier is to be classified as non-malicious. For example, the remote server may determine that the first domain name identifier was a false positive, and may initiate or implement one or more response actions, which may include classifying the first domain name identifier as non-malicious.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 8:
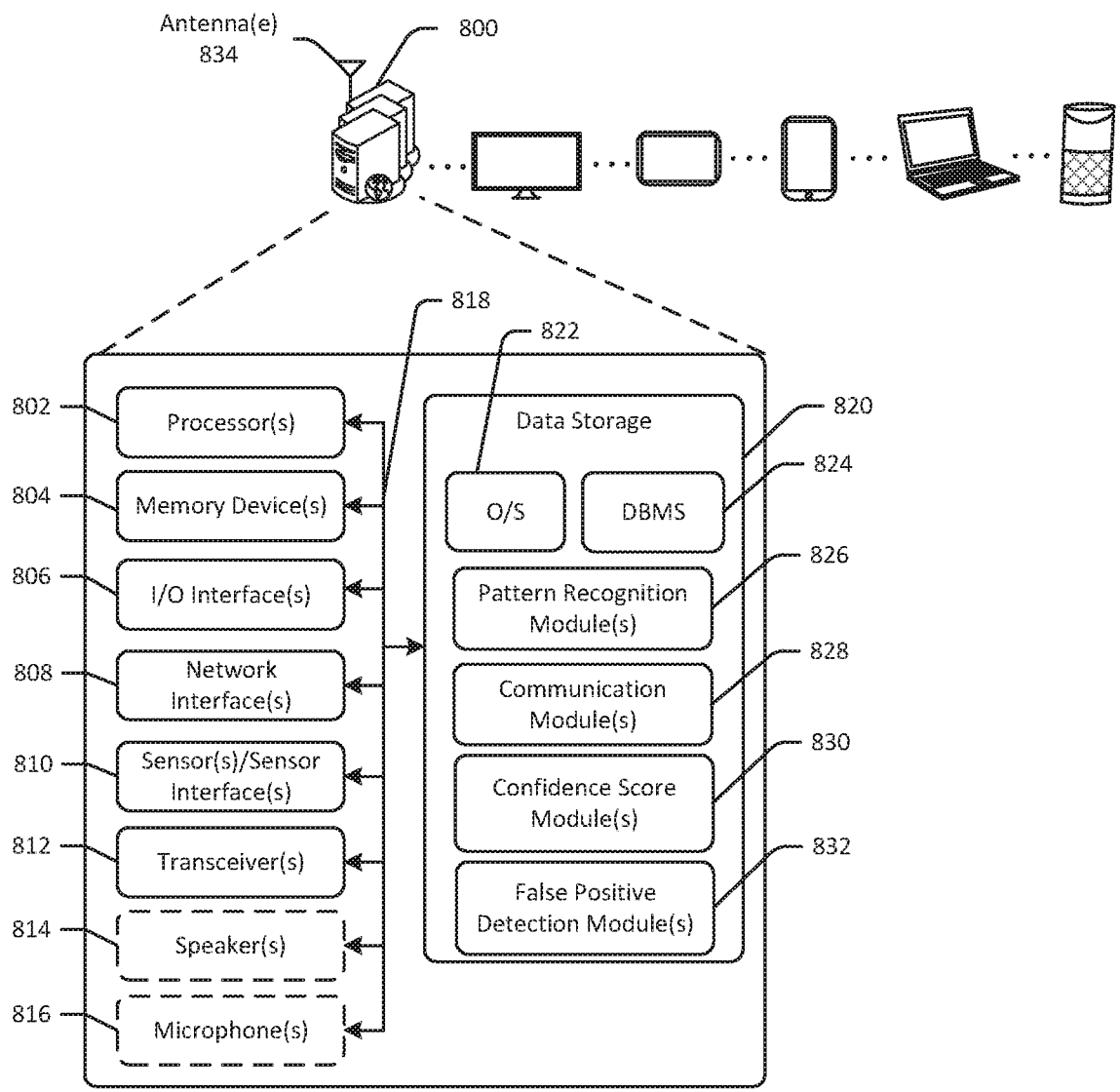
FIG. 8 is a schematic block diagram of an illustrative device in accordance with one or more example embodiments of the disclosure.

FIG. 8 is a schematic block diagram of an illustrative remote server 800 in accordance with one or more example embodiments of the disclosure. The remote server 800 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The remote server 800 may correspond to an illustrative device configuration for the devices of FIGS. 1-7.

The remote server 800 may be configured to communicate via one or more networks with one or more servers, search engines, user devices, or the like. In some embodiments, a single remote server or single group of remote servers may be configured to perform more than one type of false positive detection and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC)

medium, a microwave medium, a radio frequency communication medium, a satellite communication medium, or any combination thereof.

In an illustrative configuration, the remote server 800 may include one or more processors (processor(s)) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The remote server 800 may further include one or more buses 818 that functionally couple various components of the remote server 800. The remote server 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the remote server 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the remote server 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more pattern recognition module(s) 826, one or more communication module(s) 828, one or more confidence score module(s) 830, and/or one or more false positive detection module(s) 832. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the remote server 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, threat intelligence data, whitelisted entity data, user account information, user profile information, machine learning models, historical accuracy data, known malicious and/or non-malicious network traffic data and/or features (such as that illustrated as data 370 in FIG. 3), and other information.

The processor(s) 802 may be configured to access the memory 804 and execute computer-executable instructions loaded therein. For example, the processor(s) 802 may be configured to execute computer-executable instructions of the various program module(s), applications, engines, or the like of the remote server 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the pattern recognition module(s) 826 may include computer-executable instructions, code, or the like that responsive to execution by one or more of the processor(s) 802 may perform functions including, but not limited to, determining training data sets, determining model accuracy and/or confidence scores, comparing various features of a data set to a set of one or more aggregated data points, generating one or more machine learning models or algorithms, determining probabilities of false positives, comparing network traffic features, determining whether a domain is malicious, and the like.

The communication module(s) 828 may include computer-executable instructions, code, or the like that responsive to execution by one or more of the processor(s) 802 may perform functions including, but not limited to, communicating with one or more devices, for example, via wired or wireless communication, communicating with remote servers, communicating with remote datastores, sending or receiving notifications or alerts, communicating with cache memory data, and the like.

The confidence score module(s) 830 may include computer-executable instructions, code, or the like that responsive to execution by one or more of the processor(s) 802 may perform functions including, but not limited to, generating confidence scores for respective classifications of domains, determining confidence score thresholds, determining whether confidence score thresholds are satisfied, generating notifications, classifying data, and the like.

The false positive detection module(s) 832 may include computer-executable instructions, code, or the like that responsive to execution by one or more of the processor(s) 802 may perform functions including, but not limited to, generating whitelist notifications, pushing updates, classifying domains as malicious or non-malicious, analyzing network traffic data, extracting features, generating data objects, determining similarities and/or distances, determining vectors, determining clusters of data objects, and the like.

Referring now to other illustrative components depicted as being stored in the data storage 820, the O/S 822 may be loaded from the data storage 820 into the memory 804 and may provide an interface between other application software executing on the remote server 800 and hardware resources of the remote server 800. More specifically, the O/S 822 may include a set of computer-executable instructions for managing hardware resources of the remote server 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 1004 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 800 is a mobile device, the DBMS 824 may be any suitable light-weight DBMS optimized for performance on a mobile device.

Referring now to other illustrative components of the remote server 800, the input/output (I/O) interface(s) 806 may facilitate the receipt of input information by the remote server 800 from one or more I/O devices as well as the output of information from the remote server 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 800 may further include one or more network interface(s) 808 via which the remote server 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna(e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the remote server 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the remote server 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the remote server 800 may include alternate and/or additional hardware, software, or firmware components beyond those described or depicted without departing from the scope of the disclosure. More particularly, it should be appreciated that software, firmware, or hardware components depicted as forming part of the remote server 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to at least one memory, a set of malicious domain name identifiers from a subscription service server, the set of malicious domain name identifiers comprising a first domain name identifier and a second domain name identifier;
determining, using a domain name system (DNS) lookup tool, a first set of internet protocol (IP) addresses comprising a first IP address associated with the first domain name identifier;
determining, using the DNS lookup tool, a second set of IP addresses comprising a second IP address associated with the second domain name identifier;
determining a first virtual private cloud (VPC) flow log for a first VPC comprising network traffic corresponding to the first IP address, the first VPC flow log comprising flow log records representing network flow for each network interface in the first VPC;
generating a first data object representative of the first VPC flow log;
determining a second VPC flow log for a second VPC comprising network traffic corresponding to the second IP address, the second VPC flow log comprising flow log records representing network flow for each network interface in the second VPC;
generating a second data object representative of the second VPC flow log;
determining a first distance between the first data object and a cluster of data objects that is representative of VPC flow log data for non-malicious network traffic;
determining a second distance between the second data object and the cluster of data objects;
determining that the first distance is less than a threshold value;
determining that the first IP address is associated with non-malicious network traffic;
generating a whitelist indication for the first domain name identifier;
determining that the second distance is equal to or greater than the threshold value; and
determining that the second IP address is associated with malicious network traffic.

2. The method of claim 1, further comprising:
determining a third VPC flow log for a third VPC comprising network traffic corresponding to a third IP address that is associated with non-malicious network traffic;
generating a third data object representative of the third VPC flow log;
determining a fourth VPC flow log for a fourth VPC comprising network traffic corresponding to a fourth IP address that is associated with non-malicious network traffic;
generating a fourth data object representative of the fourth VPC flow log; and
determining that the third data object and the fourth data object at least partially form the cluster of data objects that is representative of VPC flow log data for non-malicious network traffic.

3. The method of claim 1, further comprising:
extracting first source IP address data, first destination IP address data, first transmission protocol data, first source port data, first destination port data, and first packet transmission data from the first VPC flow log; and
determining the VPC flow log data for non-malicious network traffic, wherein the VPC flow log data for non-malicious network traffic comprises second source IP address data, second destination IP address data, second transmission protocol data, second source port data, second destination port data, and second packet transmission data;
wherein determining the first distance between the first data object and the cluster of data objects that is representative of the VPC flow log data for non-malicious network traffic comprises:
  comparing the first source IP address data to the second source IP address data;
  comparing the first destination IP address data to the second destination IP address data;
  comparing the first transmission protocol data to the second transmission protocol data;
  comparing the first source port data to the second source port data;
  comparing the first destination port data to the second destination port data; and
  comparing the first packet transmission data to the second packet transmission data.

4. The method of claim 1, further comprising:
determining, using a machine learning model, a probability value indicative of a likelihood the first IP address is associated with non-malicious network traffic;
determining that the probability value satisfies a confidence score threshold value;
determining a user feedback indication that the first IP address is associated with non-malicious network traffic; and
retraining the machine learning model using the user feedback indication.

5. A method comprising:
determining, by one or more computer processors coupled to memory, a first domain name identifier in a set of domain name identifiers classified as malicious;
determining a first IP address associated with the first domain name identifier;
determining first VPC flow log data that corresponds to historical network traffic associated with the first IP address;
generating a first vector in a vector space representing the first VPC flow log data;
determining second VPC flow log data that corresponds to historical network traffic associated with a second IP address that is classified as non-malicious;
generating a second vector representing the second VPC flow log data;
determining a distance between the first vector and the second vector in the vector space;
determining, using the distance, that the first VPC flow log data is non-malicious; and
determining that the first domain name identifier is to be classified as non-malicious instead of malicious.

6. The method of claim 5, further comprising:
generating a whitelist indication for the first domain name identifier.

7. The method of claim 5, further comprising:
comparing first source port data, first destination port data, first packet size data, and first session duration data from the first VPC flow log data to second source port data, second destination port data, second packet size data, and second session duration data from the second VPC flow log data.

8. The method of claim 5, further comprising:
determining a first set of extracted features from the first VPC flow log data;
generating the first vector using the first set of extracted features;
determining a second set of extracted features from the second VPC flow log data; and
generating the second vector using the second set of extracted features.

9. The method of claim 8, further comprising:
determining a distance between the first vector and a cluster of vectors that comprises the second vector.

10. The method of claim 5, further comprising:
receiving a manual indication that third VPC flow log data associated with a third IP address is malicious; and
determining that the first VPC flow log data is dissimilar to the third VPC flow log data.

11. The method of claim 5, further comprising:
determining a third IP address associated with the first domain name identifier;
determining third VPC flow log data that corresponds to historical network traffic associated with the third IP address; and determining, using the second VPC flow log data and the third VPC flow log data, that the third VPC flow log data is non-malicious.

12. The method of claim 5, further comprising:
determining a second domain name identifier in the set of domain name identifiers classified as malicious;
determining a third IP address associated with the first domain name identifier;
determining third VPC flow log data that corresponds to historical network traffic associated with the third IP address;
determining, using the second VPC flow log data and the third VPC flow log data, that the third VPC flow log data is malicious; and
determining that the second domain name identifier is to be classified as malicious.

13. The method of claim 5, further comprising:
determining a confidence score indicative of a likelihood the first domain name identifier is to be classified as non-malicious; and
determining that the confidence score satisfies a confidence score threshold.

14. The method of claim 5, further comprising:
receiving the set of domain name identifiers classified as malicious from a third party service provider server.

15. A device comprising:
at least one memory that stores computer-executable instructions; and
at least one processor configured to access the memory and execute the computer-executable instructions to:
determine a first domain name identifier in a set of potentially malicious domain name identifiers;
determine a first IP address associated with the first domain name identifier;
determine first VPC flow log data that corresponds to historical network traffic associated with the first IP address;
generate a vector using the first VPC flow log data;
determine a cluster of VPC flow log data vectors for a plurality of IP addresses that corresponds to historical non-malicious network traffic;
determine a distance between the vector and the cluster of VPC flow log data vectors;
determine, using the distance and the cluster of VPC flow log data vectors, that the first VPC flow log data is non-malicious; and
determine that the first domain name identifier is to be classified as non-malicious instead of malicious.

16. The device of claim 15, wherein the at least one processor is further configured to access the memory and execute the computer-executable instructions to:
generate a whitelist indication for the first domain name identifier.

17. The device of claim 15, wherein the at least one processor is further configured to access the memory and execute the computer-executable instructions to:
receive the set of potentially malicious domain name identifiers classified as malicious from a third party service provider server.

* * * * *